Aug. 7, 1951     F. J. WARCUP     2,563,385
APPARATUS FOR CLEANING BEER LINES
Filed Jan. 7, 1947     3 Sheets-Sheet 1

INVENTOR.
Frederick J. Warcup
BY Emery, Varney,
Whittemore & Dyer
ATTORNEYS

Aug. 7, 1951  F. J. WARCUP  2,563,385
APPARATUS FOR CLEANING BEER LINES
Filed Jan. 7, 1947  3 Sheets-Sheet 2

INVENTOR.
Frederick J. Warcup
BY Emery, Varney,
Whittemore & Dix
ATTORNEYS

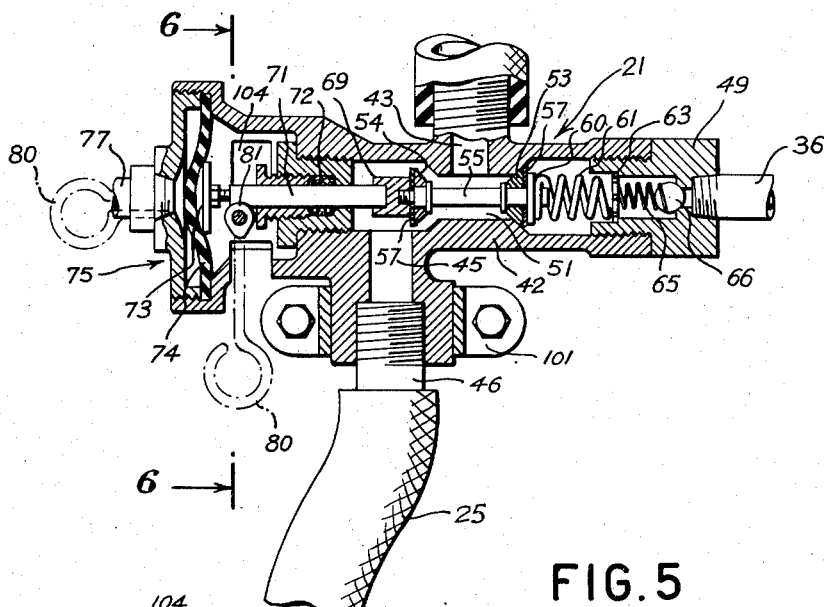
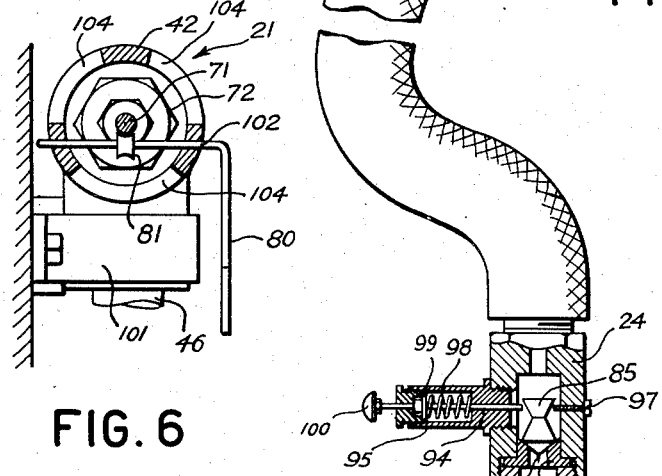
FIG. 5
FIG. 6

Patented Aug. 7, 1951

2,563,385

UNITED STATES PATENT OFFICE 2,563,385

APPARATUS FOR CLEANING BEER LINES

Frederick J. Warcup, Nyack, N. Y.

Application January 7, 1947, Serial No. 720,516

9 Claims. (Cl. 225—12)

1

This invention relates to apparatus for cleaning pipe lines such as the beer lines used in taverns for the flow of beer from a keg to a tap located on a bar.

One object of the invention is to provide improved apparatus for cleaning such lines. One feature of the invention relates to the washing out of the beer rod whenever a new keg is tapped, and another feature relates to the cleaning of the beer line with chemical cleaner.

Another object is to provide automatic apparatus by which a beer line can be cleaned in response to the operation of a knob on the bar and without disconnecting any lines. The bartender can continue his work at the bar while successively cleaning each of the beer lines.

The invention utilizes a concentrated chemical cleaner that is mixed with water before being supplied to the beer line, and some features of the invention relate to apparatus for controlling the concentration of the cleaning fluid, and to the maintenance of the correct pressures on the chemical cleaning concentrate.

Another object of the invention is to prevent possible leakage of water, or other liquid used in cleaning, into any of the beer barrels connected to the system in which the cleaner is used.

It is an important advantage of the invention that the lines can be cleaned quickly and conveniently because this results in having the lines cleaned more frequently, whereas they are not cleaned frequently enough when the operation entails substantial time and trouble. Brewers have conducted extensive campaigns to educate tavern operators on the necessity of cleaning beer lines, but in spite of such campaigns it is estimated that in approximately nine taverns out of every ten the taste of the beer in influenced adversely by lines that are not cleaned frequently enough.

Other objects, features and advantages of the invention will appear or be pointed out as the description proceeds.

Figure 1:
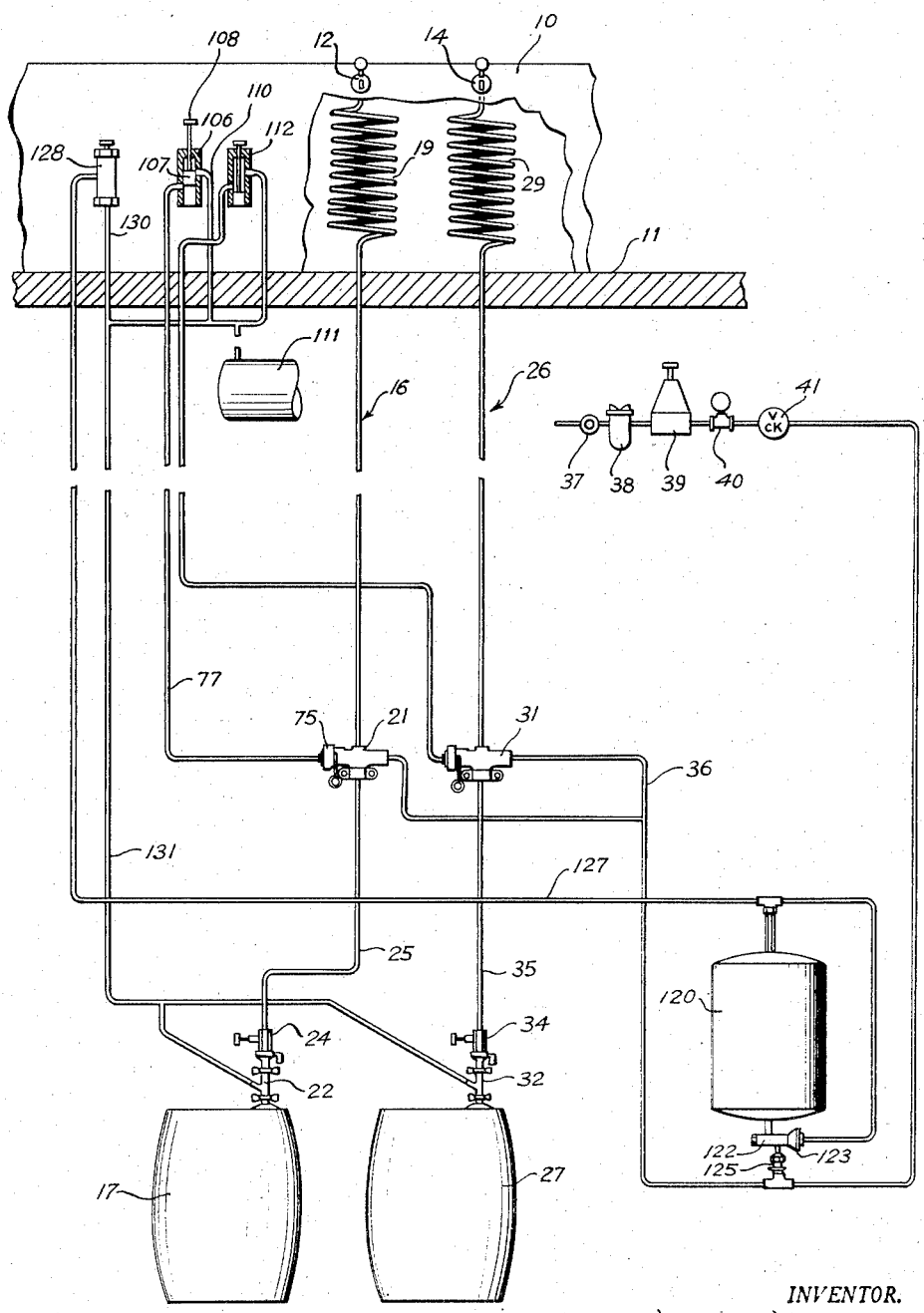
Figure 2:
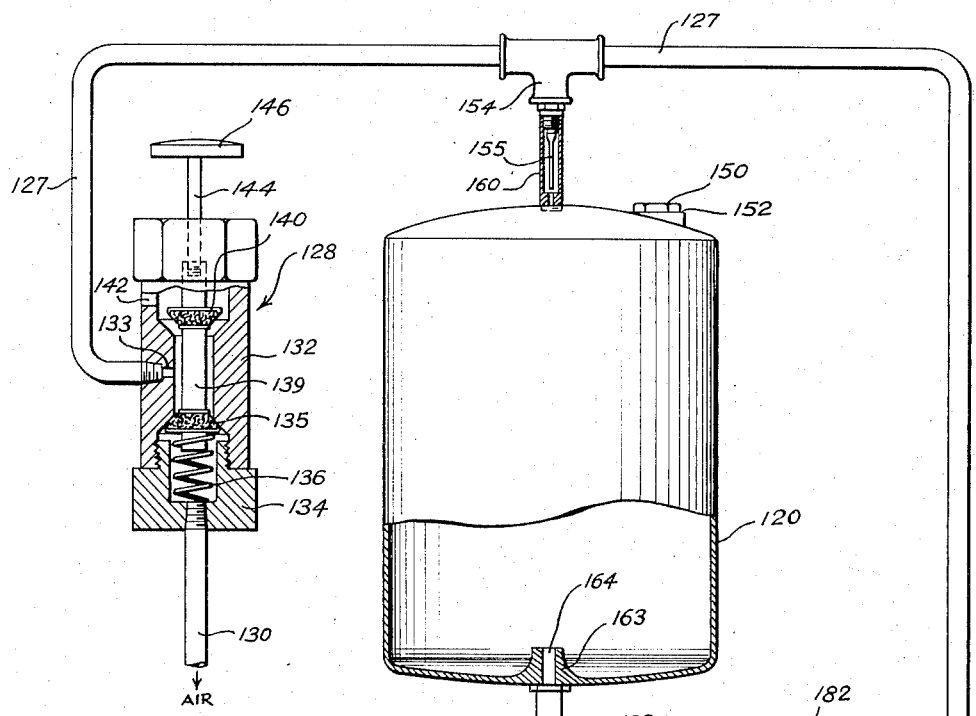
Figure 2:
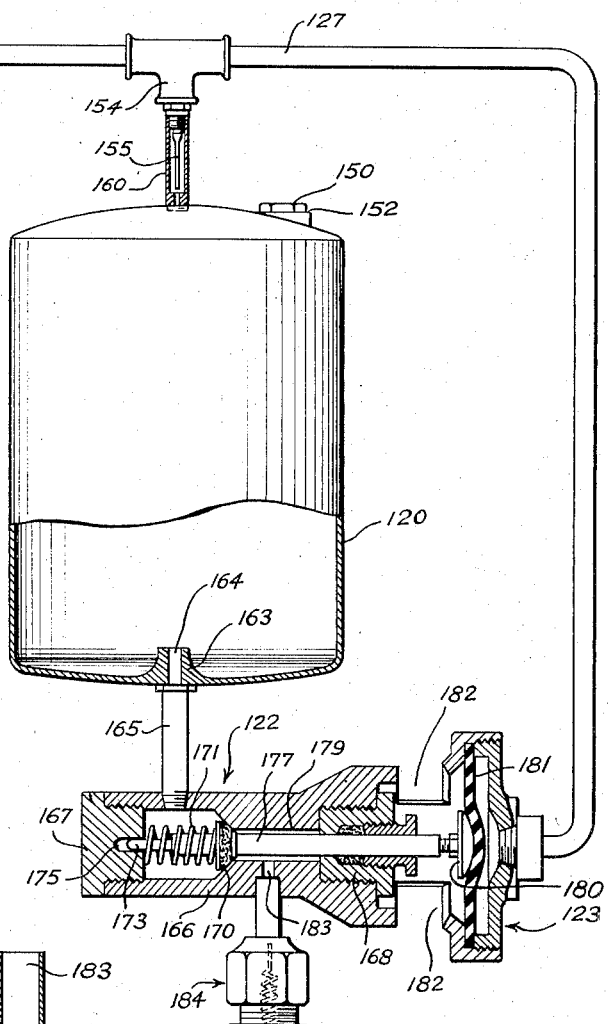
Figure 3:
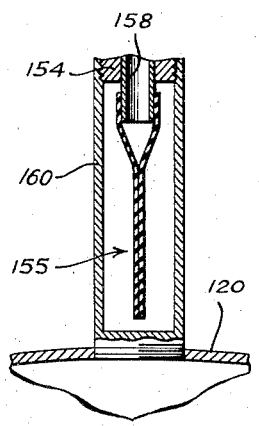

In the drawing, forming a part hereof, in which like reference characters indicate corresponding parts in all the views, Fig. 1 is a diagrammatic view illustrating a beer distributing system embodying this invention, Fig. 2 is an enlarged view, partly in section, illustrating the chemical cleaning apparatus shown in Fig. 1, Fig. 3 is an enlarged sectional view through a check valve at the top of the chemical tank of Fig. 2,

2

Figure 4:
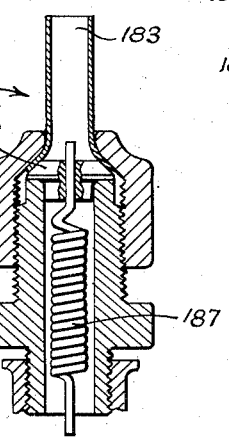

Fig. 4 is an enlarged sectional view through the capillary flow control tubing of Fig. 2, Fig. 5 is an enlarged sectional view of one of the master control valves and one of the beer rod control valves used in the system shown in Fig. 1, and, Fig. 6 is an enlarged sectional view taken on the line 6—6 of Fig. 5.

Fig. 1 shows a bar 10 located on the first floor 11 of a tavern and equipped with a plurality of taps 12 and 14. Only two taps are shown, but it will be understood that these are merely representative of a plurality of taps, it being common for bars to have four or six taps and sometimes more. The tap 12 is connected by a beer line 16 to a keg 17 located in the basement of the tavern. This beer line includes a cooling coil 19 enclosed by suitable refrigeration apparatus which is not illustrated since cooling coils in beer lines are conventional and well understood equipment. The line 16 includes also a master valve 21. Tapping equipment 22 is connected to the lower end of the line 16 below the master valve 21 through a fitting 24 and flexible hose or tubing 25 that comprises the lower end of the beer line.

The tap 14 is connected by a beer line 26 with a keg 27 in the basement, and this second beer line 26 includes a cooling coil 29 and master valve 31. Tapping equipment 32 is connected with flexible hose or tubing 35, comprising the lower end of the beer line 26, by a fitting 34 which is shown in section and on an enlarged scale. The fitting 24 is of similar construction. Each of the master valves 21 and 31 is preferably located close to the keg with which it is used. This proximity is best obtained by mounting the master valves on the wall of the room in which the kegs are kept. The master valves are thereby located within 3 to 6 feet of the kegs.

Each of the master valves 21 and 31 is connected with a water supply line 36 which connects with the city water main through a shutoff valve 37, strainer 38, pressure regulator 39, gauge 40 and check valve 41. The purpose of the master valves 21 and 31 is to selectively connect their respective beer lines 16 and 26 with either the kegs 17 and 27 respectively or the water supply line 36.

The interior structure of the valve 21 is shown in Fig. 5, and the other master supply valve 31 is of identical construction. Each of these master valves 21 and 31 comprises a valve casing 42 having a central outlet port 43 communicating with the upper part of the beer line 16 leading to the bar. The valve casing 42 has a lower port 45 connected by a nipple 46 with the flexible tubing 25 that comprises the lower portion of the beer line between the master valve 21 and the keg 17.

The water supply line 36 communicates with the interior of the valve casing 42 through a check valve 49 screwed into one end of the valve casing. The central port 43 communicates directly with a chamber 51, and there are valve seats at opposite ends of this chamber 51 for valve elements 53 and 54. These valve elements are attached to a valve stem 55 and include washers held against shoulders on the valve stem 55 by retainers 57.

The valve stem 55 is so correlated with the length of the chamber 51 between the valve seats that only one of the valve elements 53 and 54 can be in contact with its seat at any particular time. The valve element 53 is held in place by a cap 60 on the far end of the valve stem; and this valve element 53 has a strong bias toward the closed position as a result of the pressure of a spring 61 compressed between the cap 60 and a strainer 63 located in a counterbore at the inner end of the check valve 49. A similar but lighter spring 65 on the other side of the strainer 63, holds a ball valve element 66 of the check valve 49 closed against the check valve seat at all times except when water is flowing into the master valve from the water supply line 36.

The valve element 54 is held in place on the valve stem 55 by a connector 69 threaded over the end of the valve stem. At the outer end of the connector 69 there is a socket for receiving one end of a push rod 71. The push rod extends through a stuffing box 72 and connects with a head 73 which contacts with one side of an imperforate diaphragm 74. The head 73 and push rod 71 are threaded together; and the total length of the combined head and push rod can be adjusted by screwing them one way or the other with respect to one another.

This diaphragm 74 is the working part of a servo-motor 75 and is operated by air or other fluid supplied to the space in front of the diaphragm 74 through tubing 77.

Whenever compressed air is supplied to the servo-motor 75 under sufficient pressure, the diaphragm 74 displaces the push rod 71 and shifts the valve element 54 into closed position against the pressure of the spring 61. The valve element 53 is moved into open position.

Whenever the valve elements 53 and 54 are in their normal positions, as shown in Fig. 5, the beer line 16 is in direct communication with the keg 17 through the chamber 51 of the valve casing. When working fluid is supplied to the servo-motor 75 to push the valve element 54 into closed position, and the valve 53 into open position, the portion of the beer line 16 above the master valve is in communication with the water supply line 36; and if the tap on the bar is opened, water from the supply line 36 flows past the check valve element 66 around the open valve element 53 and through the central port 43 to the beer line 16.

The water pressure forces the beer in the line 16 out through the open tap until all of the beer in the line 16 has run out. The water then flows from the tap and this is a signal to the bar tender that the beer line above the master valve contains only water. Each beer line is preferably left in this condition when the tavern is shut down for the night so that there can be no yeast growth or contamination of beer such as results from having beer standing in the lines over night.

The water supply line through which water flows to the master valve to displace beer from the line 16 is a part of the "beer distributing system" for purposes of this invention.

The water pressure is preferably adjusted to a value slightly higher than the beer pressure, for example the water pressure is one or two pounds per square inch, or is as high as five pounds per square inch, greater than the beer pressure.

The hose or flexible tubing 25 remains full of beer when the valve elements 53 and 54 are shifted into position to supply water to the beer line 16 above the master valve, but this is not objectionable in most systems because the beer kegs are kept in a refrigerated compartment in the basement, and the distributing apparatus of this invention preferably locates the master valves in the refrigerated compartment so that the hose connection 25 is always at a low temperature and therefore not subject to rapid yeast growth. When the kegs are not kept in a refrigerated compartment, the master valve is preferably located on tapping equipment. This eliminates the hose between the master valve and keg.

Even though the hose 25 is refrigerated, however, it is desirable that this hose, and the beer rod 22 should be washed out at fairly frequent intervals, and this can be done every time a new keg is tapped. After the keg 17 becomes empty, for example, water can be run through the hose 25, fitting 24 and beer rod 22 by operating the servo-motor 75 to move the valve element 53 into open position, and then operating a valve actuator comprising a handle 80 and cam 81. This cam 81 turns as a unit with the handle 80 and displaces the diaphragm 74, against the pressure of the working fluid in the servo-motor 75, just far enough to cause both of the valve elements 53 and 54 to stand one-half way open at the same time. The water from the supply line 36 can then flow past the valve element 53, through the chamber 51, past the valve element 54 and down through the outlet 45 to the hose 25.

Within the fitting 24 there is a check valve element 85. This valve element 85 closes against a valve seat 87 and has a central stem 88 for guiding the lower end of the valve element 85 into alinement with the opening through seat 87. The bottom face of the valve element 85 is preferably rounded or spherical and made of rubber or plastic material having a hardness of the order of 90 (Durometer).

The side walls of the valve element 85 are frustro-conical so that the valve element 85 has a cross section of minimum diameter intermediate its upper and lower ends. A push rod 94 slides in a housing 95 attached to the side of the fitting 24. The inner end of the push rod 94 is located above the level of the minimum diameter of the check valve element 85 so that when the push rod 94 is thrust toward the right in Fig. 5, the rod 94 pushes the valve element 85 against a screw 97 and with further displacement of the push rod 94, the valve element 85 is raised from its seat by the pressure of the screw 97 and push rod 94 against opposite sides of the tapered body of the valve element. A coil spring 98 is located in the housing 95 and is compressed between one end of the housing and a flange or pin 99 secured to the push rod 94.

The valve element 85 has a stem 92 extending upward in the fitting 24 and into the path of a push rod 94. This push rod 94 slides in a housing 95 which screws into a counterbore of an opening 96 in one side of the fitting 24.

A coil spring 98 is located in the housing 95 and compressed between a shoulder at the end of the counterbore of the opening 96 and a flange 99 secured to the push rod 94. This spring 98 holds the push rod 95 in the position shown in the drawing.

A knob 100 on the outer end of the push rod 94 is pushed inward to displace the push rod 94 into contact with the check valve element 85 to lift this valve element from its seat so that water can flow from the hose 25 through the fitting 24 and out through the beer rod and tapping equipment 22. The purpose of this check valve 85 is to prevent possible leakage of water into the beer keg 17 in the event that the valve element 53 leaks when in closed position. Since the water pressure may be higher than the beer pressure it would be possible for water to flow into the keg unless prevented from doing so by the valves.

The check valve element 66 at the end of the water supply line 36 prevents beer from being forced back into the water line 36 in the event that the beer pressure in any of the kegs accidentally becomes higher than the water pressure and the valve element 53 does not close tightly enough to withstand the beer pressure.

Fig. 6 shows the master valve attached to the wall by screws extending through the sides of a bracket 101 which grips the lower end of the valve casing 42 and holds the assembly in place. This view shows also the construction of the handle 80 and cam 81 by which the master valve is moved into position to supply water to the beer rod. The handle 80 has a transverse extension 102 which passes through openings in opposite sides of the valve casing 42 and turns in these openings as bearings. The cam element 81 has a concave peripheral face and straddles the push rod 71. Since the cam 81 is pinned or otherwise rigidly fastened to the transverse extension 102, the push rod 71 holds both the cam 81 and the transverse extension 102 against endwise displacement. The handle 80 is moved up into the dotted line position shown in Fig. 5 when the cam 81 is turned into position to supply water to the beer rod. The cam 81 has a flat portion at its region of maximum throw and the pressure of the diaphragm plate assembly 73 against the flat portion of the cam holds the cam in its position of maximum displacement and handle 80 in the position indicated by the dot and dash lines in Fig. 5.

With this construction the master valve remains in position to supply water to the beer rod only as long as the work fluid under pressure is supplied to the servo-motor 75. Whenever the working fluid is released from the servo-motor 75 there will no longer be sufficient pressure against the flat portion of the cam 81 to hold the handle 80 raised, and the handle 80 will drop by gravity to the dotted line position and move the cam 81 back into position where it no longer influences the operation of the servo-motor or master valve. There are open areas 104 in the valve casing 42 around the stuffing box 72 to provide access for a tool used to adjust the packing gland of the stuffing box.

Control devices for supplying working fluid to the servo-motors of the master valves are shown in Fig. 1. The tubing 77 from the master valve 21 leads up to a valve casing 106 located on the bar. This valve casing contains a piston valve 107 operated by a knob 108 attached to one end of a valve stem outside of the casing 106.

With the piston valve 107 in the position shown, the tubing 77 is open to the atmosphere through the open end at the bottom of the valve casing 106. An air line 110 connects the upper portion of the valve casing 106 with a storage tank 111. This tank may contain compressed air or carbon dioxide, and is preferably used also to maintain a gas pressure on the beer in the kegs 17 and 27.

When the valve element 107 is pushed downward beyond the port through which the tubing 77 communicates with the valve casing 106, compressed gas from the tank 111 is supplied from the line 110 through the valve casing 106 and tubing 77 to the servo-motor 75 of the master valve 21. Another control device 112, mounted on the bar, controls the operation of the servo-motor of the master valve 31. This control device 110 is similar to the control device for supplying compressed air to the servo-motor 75 and is shown in position to maintain gas pressure on the servo-motor of the master valve 31.

Even with beer lines that are filled with water over night, and frequently washed out with clear water, it is desirable to clean the lines from time to time with a chemical cleaning medium. With this invention chemical cleaner from a reservoir 120 is introduced into the water supply line 36 whenever a beer line is to be cleaned with chemical. The discharge of the chemical cleaner, which is preferably a liquid concentrate, from the tank 120 to the water supply line 36 is regulated by flow control means comprising valve means 122, operated by a servo-motor 123 and a throttling device 125 connected in series with the valve means for limiting the rate of discharge of the chemical into the water line.

Working fluid to operate the servo-motor 123 is supplied to the motor through tubing 127 connected with a control device 128 located on the bar at the same station as the control device for the master valves 21 and 31. The expression "at the same station" is used herein to define a proximate location that permits an attendant to reach the different controls while standing in one place. Air, or other compressed gas, is supplied to the control device 128 through tubing 130 which is preferably connected with the tank 111. Compressed gas for the beer kegs is supplied from the tank 111 to the tapping equipment 22 and 32 through tubing 131.

Fig. 2 shows the internal construction of the control device 128 and the other apparatus for supplying chemical cleaner to the water supply line 36. The control device 128 includes a valve casing 132 having a center port 133 communicating with the tubing 127. The compressed gas line 130 opens through a cap 134 at the bottom of the valve casing 132 and there is a valve element 135 held against a seat in the valve casing by a spring 136. As long as this valve element 135 is held against its seat by the spring 136, the supply of compressed gas from the line 130 is shut off from the port 133.

A valve stem 139 extends upward from the valve element 135 and there is another valve element 140 attached to the upper end of the valve stem 139. This upper valve element 140 is in open position when the valve element 135 is closed and there is an exhaust port 142 through which gas from the tubing 127 can escape into the atmosphere whenever the valve element 140 is in open position.

A stem 144 extending through the upper end of the valve casing 132 is attached to a knob 146. This knob is used by the bar tender to push the valve element 140 into closed position and the valve element 135 into open position whenever compressed gas is to be supplied to the tubing 127 to operate the servo-motor 123. Whenever the bar tender releases his pressure against the knob 146, the gas from the servo-motor 123 is free to exhaust through the exhaust port 142. The valve means operated by the servo-motor 123 are so arranged that chemical cleaning fluid is supplied to the water line 36 as long as gas pressure is maintained on the servo-motor 123. It will be apparent, therefore, that the control device 128 is in effect a momentary contact control and that the operator determines the length of time that cleaning fluid feeds into the line by the length of time that he holds the knob 146 down against the pressure of the spring 136.

The reservoir or tank 120 has an opening at its upper end closed by a cap 150. This cap is removed whenever the tank 120 is to be refilled, and the cap 150 is screwed into the filler opening and has a shoulder near its upper end for clamping against a gasket 152 to seal the tank against the escape of gas pressure from within the tank.

In order to make the discharge of liquid from the tank 129 substantially independent of the depth of liquid in the tank, a branch passage 154 conducts gas from the tubing 127 into the tank 120. There is a check valve 155 in the branch passage 154 for preventing escape of the gas from the reservoir 120 when the tubing 124 is open to exhaust.

Fig. 3 shows the construction of the check valve 155. It comprises a sleeve, of rubber or similar material, having a flattened lower end so formed that the sides of the sleeve contact with one another and close the sleeve against the entrance of gas into the lower end of the sleeve. At its upper end, the sleeve fits over a nipple 158 which extends downward from the branch passage 154. Gas entering the upper end of the sleeve opens the check valve by forcing the contacting sides of the check valve sleeve apart by internal pressure. A fitting 160 provides a housing for the check valve 155 and serves as the lower end of the branch passage 154 through which gas flows to the reservoir 120.

At the bottom of the reservoir 120 there is a boss 163, and an outlet 164 opens through the top surface of the boss 163 and communicates with the valve means 122 through a nipple 165. By having the outlet 164 raised above the bottom of the reservoir 120, any dirt and sediment that eventually collects on the bottom of the reservoir remains there and is not carried into the flow control means beyond.

The valve means 122 includes a casing 166 closed at one end by a cap 167 and at the other end by a stuffing box 168. A valve element 170, in a chamber of the valve casing, is urged against a seat at the right-hand end of the housing by a spring 171. A valve stem 173 extending from one side of the valve element 170 slides in a guide 175 in the cap 167. A valve stem 177 extends from the other side of the valve element 170 through a passage 179 in the valve casing and then through the stuffing box 168 to a head 180 that contacts with a diaphragm 181 of the servo-motor 123.

When air under pressure is supplied to the servo-motor 123 the diaphragm 181 displaces the head 180 and its connected valve stem 177 toward the left and moves the valve element 170 into open position. The head 180 and valve stem 177 are threaded together, and their combined length can be adjusted by rotating them with respect to one another. Friction is sufficient to keep the head and valve stem in any adjusted relation. When the air pressure is released, the spring 171 moves the valve element 170 into closed position. The portion of the casing 166 that connects with the servo-motor 123 has openings 182 through which a tool can be inserted for adjusting the stuffing box 168.

There is an outlet 183 through which the passage 179 communicates with a fitting 184 below the valve casing 166. This fitting is shown in detail in Fig. 4, and includes a partition 186 and a capillary tube 187 that opens through the partition. Although other throttling means can be employed, the capillary tube 187, wound as a helix to increase its length, has been proved very satisfactory by experience. The upper end of the capillary tube 187 extends for a substantial distance above the partition 186 so that any dirt or sediment that accumulates on the partition cannot be drawn into the capillary.

In a system having a water pressure of from 20 to 35 pounds per square inch, and a gas pressure in the reservoir somewhat higher than the existing water pressure, a capillary six inches in length and made of $\frac{3}{32}$ inch tubing is satisfactory. This size of tubing has an inside diameter of .067 inch. These figures are given merely by way of illustration, and the throttling desired depends upon various factors including the degree of concentration of the cleaning chemical.

The lower end of the capillary, preferably extends down into the actual water stream that flows through a T by which the fitting 184 is connected in the water supply line 36 so that the cleaning chemical which bleeds out of the capillary will distribute uniformly through the passing stream of water.

The preferred embodiment of the invention has been illustrated and described, but various changes and modifications can be made and features of the invention can be used in different combinations without departing from the invention as defined in the claims.

What is claimed is:

1. In a beer distributing system a beer line leading from a keg to a tap, a master valve in said beer line, a water supply line leading to the master valve, valve elements in the master valve movable into different positions to put the tap in communication selectively with either the keg or the water supply line, a regulator in the water supply line for coordinating the water pressure with the beer pressure in the system, a tank for holding a chemical cleaning liquid, a branch conduit extending from the water line and through which the tank communicates with the water line at a location between the regulator and the master valve, flow control means for determining the rate of discharge of liquid from the tank into a stream of water flowing in the water supply line, and a shut-off valve in the branch conduit at a location where it is operable to stop the flow of chemical cleaning liquid while water continues to flow in the water line, and a gas supply line communicating with the interior of the tank for maintaining a gas pressure in the tank.

2. In a beer distributing system the combination of a pipe line for connecting a beer keg with a tap, a water supply line, valve means for connecting the pipe line selectively with the water supply line or the beer keg, a chemical tank for holding a liquid cleaning concentrate, a branch conduit leading from the water supply line to the chemical tank and including a capillary through which the liquid cleaning concentrate flows from the tank into a water stream flowing through the water supply line, and a valve for controlling the discharge of cleaning concentrate through the capillary.

3. The combination with a beer distributing system of a water line permanently connected to the system for supplying water to the system, a shut-off valve for the water line, a chemical tank for holding a cleaning concentrate, a branch conduit from the water supply line including a capillary through which the chemical tank communicates with the water supply line, and a valve commanding the capillary.

4. Apparatus for cleaning a beer distributing system including valve means by which a beer line can be connected selectively with either a beer keg or a water supply line, a tank for holding liquid cleaner concentrate, a discharge conduit located at the bottom of the tank and having its entrance elevated above the bottom of the tank to prevent the entrance of sediment and dirt into said discharge conduit, a partition in the discharge conduit, and a capillary tube extending through the partition and forming the end portion of the discharge conduit for supplying cleaner concentrate to the water supply line, the entrance to said capillary tube being at an elevation above the lower end of the portion of the discharge conduit ahead of said partition.

5. In a beer distributing system including a valve means for selectively connecting a beer line with a beer keg or a water supply line, a chemical tank for holding liquid cleaner concentrate, a conduit connecting the chemical tank with the water supply line, and a valve for controlling the discharge of cleaner concentrate from the tank into the water supply line, said valve comprising a seat and a valve element that closes against said seat in the direction of liquid flow so that the valve element is held against the seat by the pressure of liquid in the tank.

6. The combination with a beer line, of a water line permanently connected with the beer line for introducing water or a cleaning solution selectively into the beer line, valve means movable into one position to put the beer line in communication with a keg and movable into another position to put the beer line in communication with the water line, apparatus including a branch conduit that extends from the water line for introducing a cleaner concentrate into a stream of water flowing through the water line toward the valve means and the beer line, a shut-off valve commanding the branch conduit and operable to shut off the supply of cleaner concentrate when the beer line is to be filled with clear water, operating mechanism for the shut-off valve including a servo-motor, and a control device remote from said servo-motor for controlling the supply of working fluid to the servo-motor.

7. The combination with a beer line for the flow of beer from a keg to a tap located on a bar, of a water line for introducing water or a cleaning solution selectively into the beer line, valve means movable into one position to put the beer line in communication with a keg and movable into another position to put the beer line in communication with the water line, apparatus including a branch conduit that extends from the water line for introducing a cleaner concentrate into a stream of water flowing through the water line toward the valve means and the beer line, a shut-off valve commanding the branch conduit and operable to shut off the supply of cleaner concentrate when the beer line is to be filled with clear water, operating mechanism for the shut-off valve including a servo-motor, and a control device for the servo-motor comprising a valve located at the bar in the region of the tap at the upper end of the beer line, and a conduit commanded by said valve and extending to the servo-motor from a source of working fluid.

8. In a beer distributing system including a master valve, an upper beer line leading from the master valve to a tap, a lower beer line leading from the master valve to a beer rod, a water supply line connected with the master valve, apparatus for introducing a chemical cleaner into the water supply line, valve elements in the master valve movable into position to put the water supply line into communication with both the upper and lower beer lines, a valve casing having an inlet connected to the lower beer line and an outlet connected to the master valve, a valve seat at the inlet, a valve movable back and forth in response to difference in pressure at the inlet and outlet, respectively, between an operative position in which it engages said seat to prevent back flow and an inoperative position in which beer may flow from the lower beer line to the master valve, and a device for rendering said check valve ineffective when the beer rod is to be cleaned.

9. A beer distributing system comprising a tap, a beer rod for insertion into a beer keg, a supply line leading from the beer rod to the tap, a valve casing having an inlet connected to the beer keg and an outlet connected to the tap, a valve seat at the inlet and a valve movable back and forth in response to difference in pressure at the inlet and outlet, respectively, between an operative position in which it engages said seat to prevent back flow and an inoperative position in which beer may flow from the keg to the tap.

FREDERICK J. WARCUP.

REFERENCES CITED

The following references are of record in the file of this patent:

UNITED STATES PATENTS

| Number | Name | Date |
|---|---|---|
| 596,432 | Cronin | Dec. 28, 1897 |
| 774,461 | Wolf | Nov. 8, 1904 |
| 877,043 | Bowers | Jan. 21, 1908 |
| 1,931,927 | Burkett | Oct. 24, 1933 |
| 2,066,397 | Fogarty | Jan. 5, 1937 |
| 2,443,550 | Zwesta | June 15, 1948 |
| 2,482,778 | Joerren | Sept. 27, 1949 |